July 10, 1928.

H. FORD 1,677,118

FUEL FILTERING SCREEN

Filed Feb. 14, 1927 2 Sheets-Sheet 1

INVENTOR.
Henry Ford.
BY C. R. Halbert.
E. L. Davis.
ATTORNEYS.

July 10, 1928.
H. FORD
1,677,118
FUEL FILTERING SCREEN
Filed Feb. 14, 1927     2 Sheets-Sheet 2
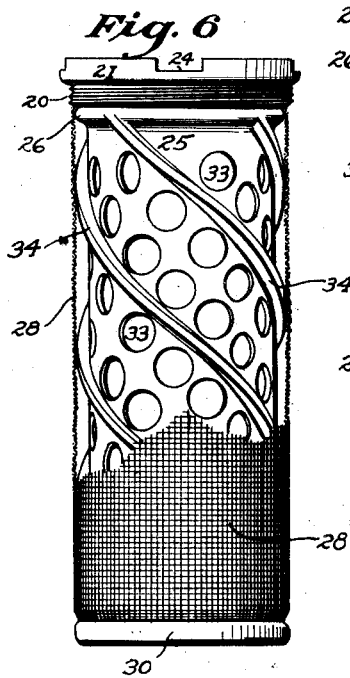
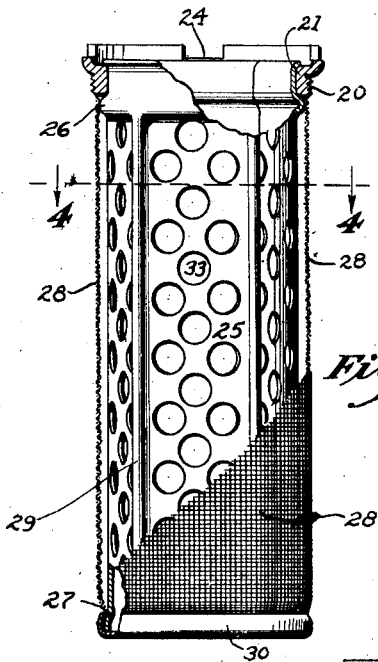
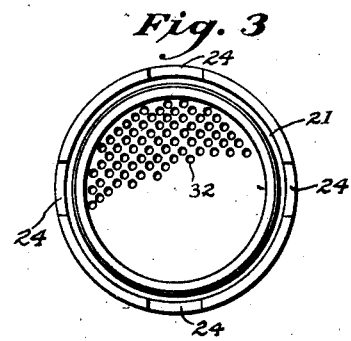
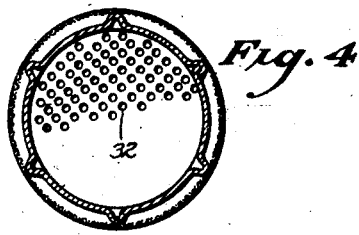
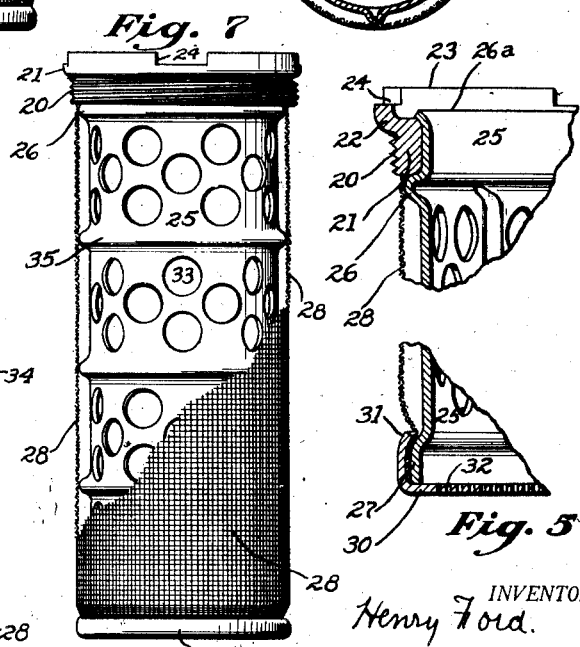
INVENTOR.
Henry Ford.
BY C. R. Halbert,
E. L. Davis.
ATTORNEYS.

Patented July 10, 1928.

1,677,118

UNITED STATES PATENT OFFICE.

HENRY FORD, OF DEARBORN, MICHIGAN.

FUEL-FILTERING SCREEN.

Application filed February 14, 1927. Serial No. 167,911.

The object of my invention is to provide a fuel filtering screen of simple, durable, and inexpensive construction.

A further object of my invention is to provide a fuel filtering screen especially adapted for use in connection with automotive vehicles, and having a minimum number of parts, and which may be conveniently and readily installed, removed, or replaced.

Still a further object of my invention is to provide a fuel filtering screen which will allow the free filtering through of as much or more fuel than will be allowed to enter the screen by a fuel nozzle placed in the fuel tank.

Still a further object of my invention is to provide in combination with my filtering screen a protecting guard which will prevent the fuel nozzle from rupturing the screen when being inserted or taken out of the fuel tank.

Still a further object of my invention is to provide in combination with my filtering screen a guard which will allow free movement of the fuel through it, and which will hold the screen in position and present a minimum of contact surface between it and the screen so as to allow the maximum area of the screen to be used for filtering the fuel.

Still a further object of my invention is to provide a filter screen guard, which will allow the use of a comparatively fragile filtering gauze and which will support the same in a plurality of places.

Still a further object of my invention is to provide a filter screen which is so constructed and installed that it will prevent a flame, originating outside of the fuel tank, from entering the tank, thereby preventing the probability of damage from a possible explosion of the fuel tank.

With these and other objects in view my invention consists in the arrangement, combination, and construction of the various parts of my improved device as described in the specifications, claimed in the claims, and illustrated in the accompanying drawings in which:

Fig. 2 shows a side elevation of my improved screen with the guard having vertical screen locating ribs, parts being broken away to better illustrate the construction.

Fig. 3 shows a top view of my improved screen.

Fig. 4 shows a horizontal, sectional view, taken on line 4—4 of Fig. 2.

Fig. 5 shows an enlarged vertical central sectional view of my improved device to better illustrate the construction.

Fig. 6 shows a side elevation of my improved filtering screen with spiral screen locating ribs, parts being broken away to better illustrate the construction.

Fig. 7 shows a side elevation of my improved filtering screen with horizontal screen locating ribs, parts being broken away to better illustrate the construction.

Figure 1:
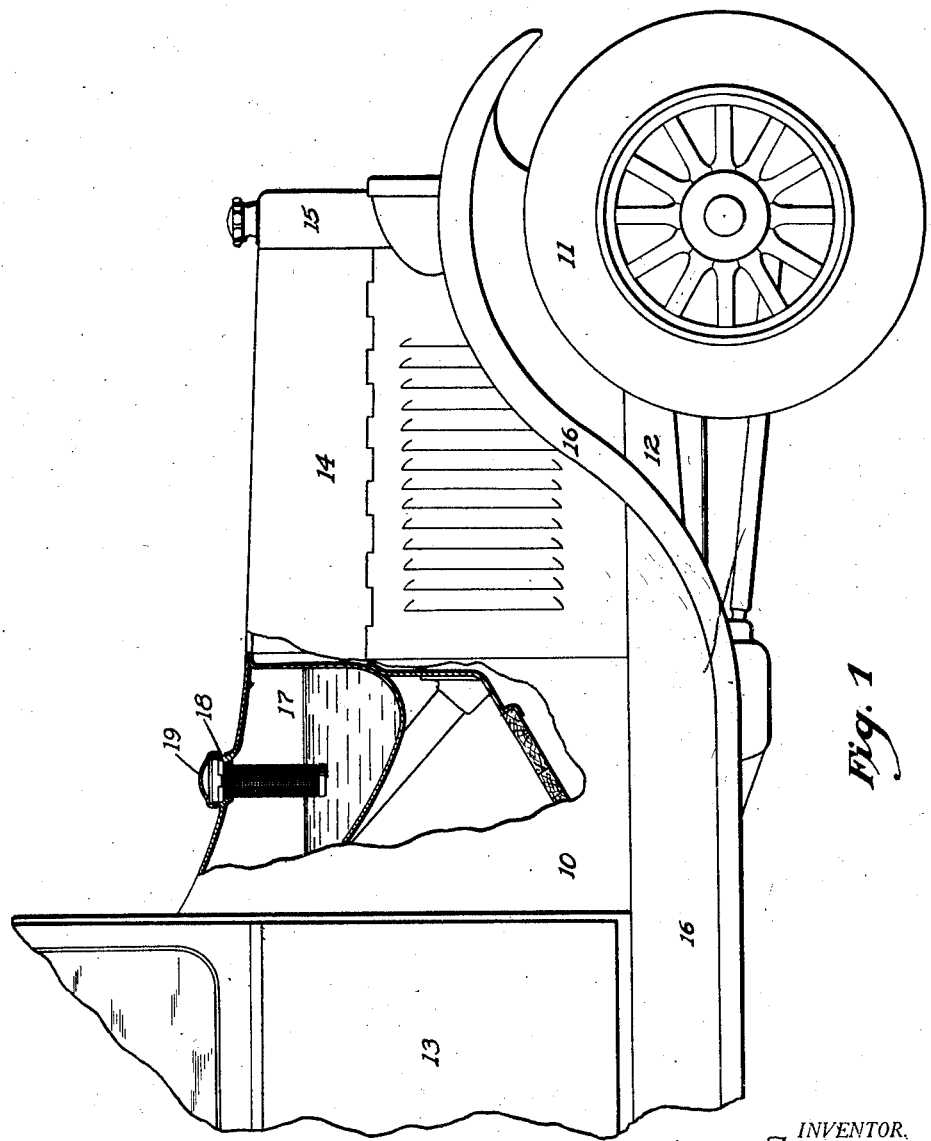
Fig. 1 shows a partial side view of a motor vehicle with part of the cowl fuel tank cut away to better illustrate the location of my improved filtering screen.

Referring to the accompanying drawings I have used the reference numeral 10 to indicate generally the cowl of an automobile which has a front wheel 11, supporting the frame 12, upon which is mounted the body 13, the hood 14, the radiator 15 and the fenders and running board 16.

A fuel tank 17 is formed integrally with the cowl 10 as shown in Fig. 1. However, the fuel tank may be placed in any convenient place on the vehicle, as it forms no part of my invention, but is merely shown to illustrate the use of my improved device. Located in the upper part of the fuel tank 17 is a filler neck 18 which has external screw threads cut upon its outer end which co-act with internal threads cut in the cap 19, the latter forming a removable stopper for the tank. The inside of filler neck 18 also has been provided with internal threads cut in its lower part to co-act with external threads 20 cut in the filter screen retaining ring 21.

The ring 21 is provided with an annular outwardly extending flange 22 which terminates in an upwardly extending rim 23. A plurality of slots 24 are formed in this rim so as to co-act with a suitable spanner wrench, when it is desired to screw the ring 21 so as to remove the filter screen from or insert it into the fuel tank.

The guard 25 is a hollow metallic cylinder and has an outwardly extending bead 26 of channel cross section disposed adjacent to the lower edge of ring 21.

The upper end of the guard 25 is flanged over ring 21 at 26ª to secure the guard in place on the ring 21. The lower end of the guard 25 is expanded as at 27 to form a support for the screen 28, which will hereinafter be described.

A plurality of vertical ribs 29 extend outwardly from guard 25 to form a support for the filter screen 28. A plurality of relatively large openings 33 are formed in guard 25 in such position as to allow the fuel to flow freely through them but still not materially weaken the guard. The number of holes is not important but their total area should be several times the cross-sectional area of the largest fuel nozzle which can be used in the opening at the top of the guard, so as to allow the fuel to flow freely to the screen thereby preventing the fuel from backing up and overflowing over the outside of the tank.

The screen 28 is preferably made from metallic gauze of not less than 30 mesh and is cylindrical in form extending from the lower edge of ring 21, to which it is secured, down and over the outer edges of ribs 29 over the enlarged lower end 27 of guard 25. A metallic cup shaped member 30 is disposed at the bottom part of the guard 25 and the screen 28. As will be seen from Fig. 5, the flange of cup 30 is placed over the lower ends of screen 28 and guard 25, and extends to a position where the upper edge may be spun or pressed inwardly over the shoulder formed at the top of the enlarged end 27 of the guard 25, as illustrated at 31, thereby securing the wire mesh firmly to the lower end of the guard and also forming a bottom for the filtering screen. Cup 30 may be formed from perforated stock if desired, the openings 33 being not larger than one thirty-second of an inch in diameter.

In connection with the openings 33 in cup 30 and the mesh of the screen 28, it may be well to point out that the protection from explosions gained by the use of my improved device depends upon the principle governing the propagation of a gas flame through a small metallic surrounded orifice. The flame upon travelling through each orifice of the wire mesh 28 is cooled, by the absorption of part of its heat by the metallic mesh, to a temperature below the flash point of the gas mixture on the reverse side of the screen. As the amount of heat absorbed is inversely proportional to the velocity of the gas travelling through the orifice and the temperature of the mesh, and as the velocity of the gas is a variable quantity, depending upon several factors, and as the temperature of the mesh may be raised by continually burning gas, it will be seen that no exact size may be given for the orifices. However, the ratio of the size of the orifices to the surrounding space occupied by the wire should not be over one to two. I have found by experiment that a forty mesh screen of woven wire ten one thousandth inches in diameter allows free filtering of the fuel and also prevents any possible explosions in the fuel tank from an outside flame.

The aforementioned mesh has been found to give no noticeable back pressure to the fuel, when the tank is being filled from the ordinary gasoline pump, if the total area of the mesh is about twenty times the area of the neck of the guard 25. However, this ratio may be changed by lengthening or enlarging the screen, to suit various requirements without departing from the spirit of my invention.

The function of the ribs 29 shown in Fig. 2 is important inasmuch as the efficiency of my device is materially increased when they are used. If the gauze 28 was wrapped around or placed in close contact with guard 25, only the area of the gauze corresponding to the openings 33 in the guard would be available to filter the fuel. When the gauze is spaced a distance from the guard the fuel is allowed to travel through the holes 33 and then spread out so as to filter through all of the gauze 28.

I have shown several forms of ribs used for locating the gauze, all of which are equally effective from the standpoint of filtering the fuel. Figure 2 illustrates a vertical rib 29 which is especially convenient to form when it is desired to make the guard out of a single piece of flat metal.

Figure 6 illustrates a spiral rib 34 which is somewhat more expensive to form than the other types but stiffens the gauze more as the ribs cross both the horizontal and vertical wires of the mesh.

Fig. 7 illustrates a type of rib 35 formed by rolling a plurality of annular ribs on the outside of the guard 25 thereby making the unsupported length of the gauze a very small amount. When it is desired to make the guard from tubing, this type of rib is especially convenient to form.

One of the many advantages arising from the use of a guard of the type here illustrated is that a filtering gauze composed of fine wires spaced very closely together may be used. As is well known this fine gauze forms a very good filter screen and allows the fuel to filter through very quickly, but it has the disadvantage of being very fragile. When my improved type of guard is used in connection with this fine gauze a support is given to the gauze and further a strong guard is formed to protect the gauze from any possible injury, as from a gasoline filler nozzle.

The method of assembling my improved filter screen is quite simple, the only operations being the spinning of the end of guard 25 into ring 21, sliding screen 28 over the guard up to the ring 28 where it may be soldered, and placing cap 30 on the lower end of guard 25 where it is pressed inwardly to form a lock as at 31. The whole unit is then screwed into the filler neck of the fuel tank.

Some changes may be made in the construction and arrangement of the various parts of my improved device without departing from the spirit of my invention, and it is my intention to cover by my claims such changes as may reasonably be included in the scope thereof.

I claim as my invention:

1. In a device of the character described, a ring member adapted to be detachably mounted in a filler neck of a tank, a cylindrical guard member having portions thereof beaded outwardly and having a plurality of openings therethrough, means for securing the upper end of said guard member rigidly to said ring member, a cylindrical screen member surrounding said guard member and having its upper end secured to said ring, and a cup member receiving the lower end of the screen and the guard and adapted to form an enclosure therefor and to secure the guard and screen member together.

2. In a device of the character described, a ring member adapted to be detachably mounted in a filler opening of a tank, a cylindrical guard member having portions thereof beaded and having a plurality of openings therethrough, means for securing the upper end of said guard member to said ring member, a cylindrical screen member having its upper end secured to said ring, and a cap member adapted to receive the lower end of said screen and guard member and to secure same together and to form a closure therefor, said cap member having perforations therein of the same diameter as the mesh of the screen member.

HENRY FORD.